US010005558B2

(12) United States Patent
Cailleteau (10) Patent No.: US 10,005,558 B2
(45) Date of Patent: Jun. 26, 2018

(54) TRACK FITTING FOR AIRCRAFT SEATS (71) Applicant: Zodiac Seats France, Issoudun (FR)

(72) Inventor: Jeremy Cailleteau, Saint Aout (FR)

(73) Assignee: Zodiac Seats France, Issoudun (FR)

( * ) Notice: Subject to any disclaimer, the term of this patent is extended or adjusted under 35 U.S.C. 154(b) by 27 days.

(21) Appl. No.: 15/128,165

(22) PCT Filed: Mar. 30, 2015

(86) PCT No.: PCT/IB2015/052343
§ 371 (c)(1),
(2) Date: Sep. 22, 2016

(87) PCT Pub. No.: WO2015/145409
PCT Pub. Date: Oct. 1, 2015

(65) Prior Publication Data
US 2017/0129613 A1 May 11, 2017

Related U.S. Application Data

(60) Provisional application No. 61/971,692, filed on Mar. 28, 2014.

(51) Int. Cl.
*B64D 11/06* (2006.01)
*A47B 91/08* (2006.01)

(52) U.S. Cl.
CPC .......... *B64D 11/0696* (2013.01); *A47B 91/08* (2013.01)

(58) Field of Classification Search
CPC ................ B64D 11/0696; B64D 9/003; B60N 2/01558; B60P 7/0815; B64C 1/20
See application file for complete search history.

(56) References Cited

U.S. PATENT DOCUMENTS 3,652,050 A * 3/1972 Marrujo ............. B60N 2/01558
248/393
4,213,593 A    7/1980 Weik
4,230,432 A   10/1980 Howell
(Continued)

FOREIGN PATENT DOCUMENTS

| DE | 29825000 | 3/2004 |
|----|----------|--------|
| WO | 2015145409 | 10/2015 |
| WO | 2015198278 | 12/2015 |

OTHER PUBLICATIONS

International Patent Application No. PCT/IB2015/052343, Search Report and Written Opinion dated Jun. 15, 2015.
(Continued)

*Primary Examiner* — Bradley Duckworth
(74) *Attorney, Agent, or Firm* — Kilpatrick Townsend & Stockton LLP; Dean W. Russell; Anthony L. Guebert (57) ABSTRACT

Described are seat track fittings (100) with a stud (102) having a spacer (104) separated from a lower flange (106), and a locking mechanism (110). The locking mechanism includes an elastic fitting (112) having an upper arm (116*a*) and a lower arm (116*b*) connected by a resilient member (120). An end of the upper arm and an end the lower arm are coupled to the stud, with the end of the upper arm positioned above the spacer, and the end of the lower arm positioned above the lower flange. An activation mechanism (114) is coupled to the elastic fitting to transition the seat track fitting between unloaded, unlocked, and locked positions.

23 Claims, 6 Drawing Sheets

(56) References Cited

U.S. PATENT DOCUMENTS

| | | | | |
|---|---|---|---|---|
| 4,396,175 | A * | 8/1983 | Long | B64D 11/0696 244/118.6 |
| 4,449,875 | A * | 5/1984 | Brunelle | B64D 11/0696 244/118.5 |
| 4,911,381 | A * | 3/1990 | Cannon | B64D 11/0696 244/122 R |
| 5,348,264 | A * | 9/1994 | Few | B60N 2/3097 248/503.1 |
| 5,449,132 | A * | 9/1995 | Gilbert | B64D 11/0696 244/122 R |
| 6,644,901 | B2 * | 11/2003 | Breckel | B60P 7/0815 410/104 |
| 7,713,009 | B2 * | 5/2010 | Hudson | B64D 11/0696 410/104 |
| 7,785,053 | B2 * | 8/2010 | Hudson | B64D 11/0696 410/104 |
| 7,857,561 | B2 * | 12/2010 | Mejuhas | B64D 11/0696 410/105 |
| 8,074,954 | B2 * | 12/2011 | Wilhelm | B64D 11/0696 244/118.6 |
| 8,337,127 | B2 * | 12/2012 | Moradians | B60P 7/0815 410/101 |
| 8,517,310 | B2 * | 8/2013 | Marechal | B60N 2/01516 244/118.6 |
| 9,291,190 | B2 * | 3/2016 | Kammerer | F16B 43/00 |
| 2010/0124457 | A1 | 5/2010 | Cook et al. | |
| 2017/0197722 | A1 | 7/2017 | Marais | |

OTHER PUBLICATIONS

International Patent Application No. PCT/IB2015/054822, International Preliminary Report on Patentability dated Jan. 5, 2017.

International Patent Application No. PCT/IB2015/054822, Search Report and Written Opinion dated Sep. 25, 2015.

International Patent Application No. PCT/IB2015/052343, International Preliminary Report on Patentability dated Oct. 4, 2016.

* cited by examiner

TRACK FITTING FOR AIRCRAFT SEATS

CROSS REFERENCE TO RELATED APPLICATIONS

This application is the U.S. national phase entry of International Patent Application Serial No. PCT/IB2015/052343 ("the '343 application"), filed on Mar. 30, 2015, which application is related to and claims priority benefits from U.S. Provisional Application Ser. No. 61/971,692 ("the '692 application"), filed on Mar. 28, 2014, entitled TRACK FITTING FOR AIRCRAFT SEATS, the entire contents the each of which are incorporated herein by reference.

FIELD OF THE INVENTION

The invention relates to track fittings for aircraft seats.

BACKGROUND

Some embodiments of the invention relate to an aircraft seat attachment provided with a system for maintaining a clamping force by a spring effect. Some embodiments of the invention relate to an aircraft seat attachment provided with a system for locking an activation lever.

Figure 1A:
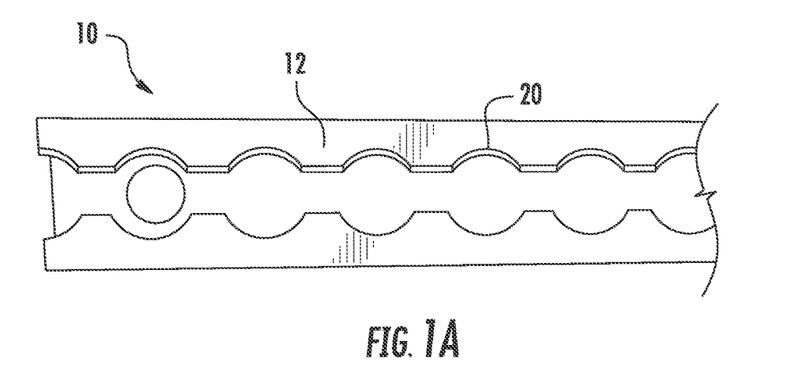
FIGS. 1a and 1b are plan and perspective views of a seat track onto which aircraft seats are to be fixed by means of attachments according to certain embodiments of the present invention.
Figure 1B:
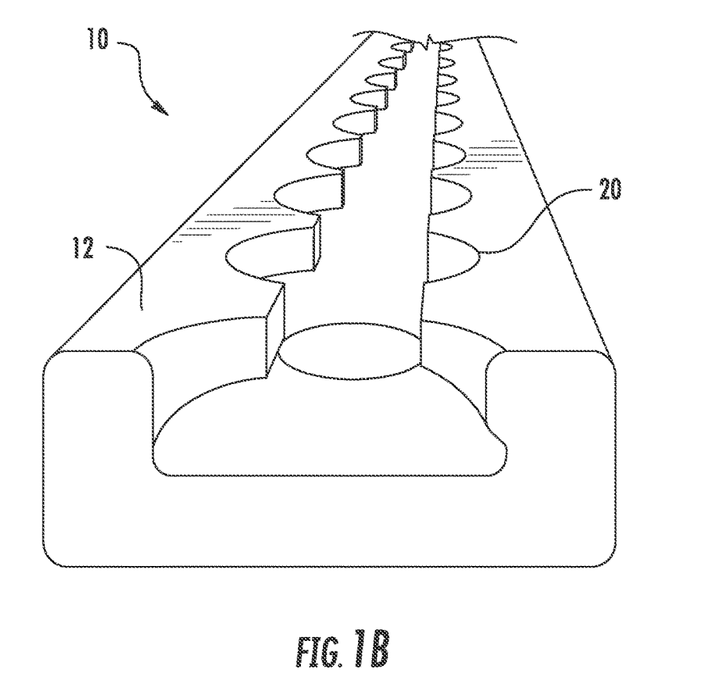

Aircraft passenger seats are generally mounted on a track 10, as shown in FIGS. 1a and 1b. The track 10 is a section having an upper lip 12 onto which the seat track fitting is clamped, this lip 12 being machined to enable insertion of the lower part of the attachment (studs) under the lip 12 of the track 10.

A seat is generally fixed to the track 10 by means of at least three attachments, typically four, two at the front of the seat and two at the rear. A passenger seat attachment 14, such as that shown in FIG. 2, must typically fulfill two principal functions, namely:
  clamping the attachment 14 to the lip 12 of the track 10 to prevent any movement, and
  for the rear attachments, transferring longitudinal loads, for example in the event of a crash, from the seat to the track 10.

To this end, the attachment 14 comprises at least one stud 16 to be positioned under the lip 12 of the track 10. This stud 16 is either fixed relative to the attachment 14, in which case the attachment 14 includes a plunger 18 configured to vertically translate relative to a body 34 of the attachment (cf. FIG. 2), or the stud 16 is configured to vertically translate relative to the body 34 of the attachment 14.

Figure 2:
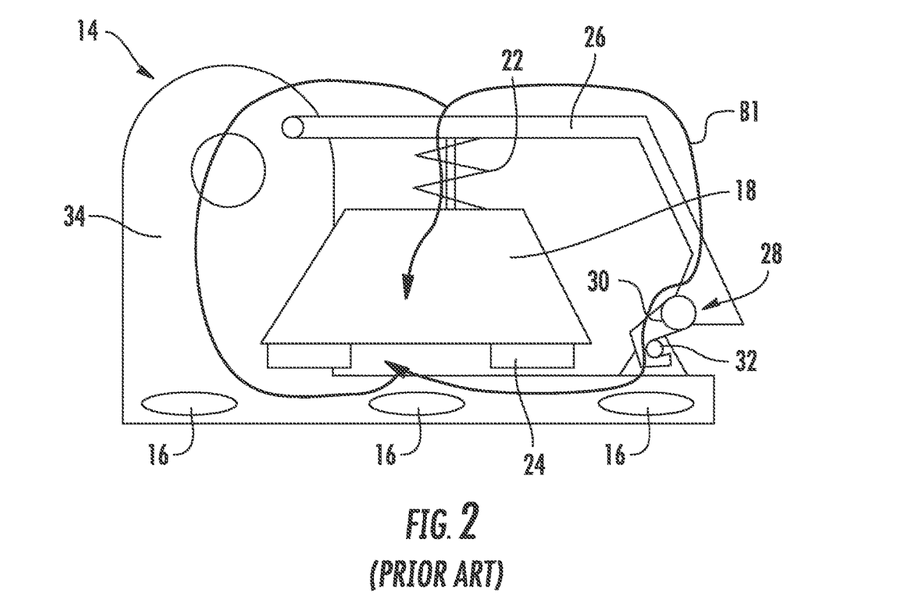
FIG. 2 is a diagrammatic representation of a prior art seat attachment provided with a spring system for generating the clamping force on the track.

To fix the seat to the track 10, the stud 16 enters a hole 20 in the track 10 and then moves longitudinally along the length of the track 10 by a half-pitch of the hole 20 to be located under the lip 12 of the track 10. The stud 16 is then moved vertically in order to come into contact with the lower face of the lip 12 and create a positive clamping action on the lip 12 of the track 10.

Two techniques are usually employed to generate the force clamping the attachment to the lip 12 of the track 10:
  using a screw to move the stud 16 or the plunger 18 vertically; in this case, a hand tool is necessary and the clamping torque must be controlled in order to guarantee the clamping effect; this solution also enables infinite adjustment, making it possible to compensate for the tolerances of the parts used, or
  using a system with no adjustments, possibly requiring the use of a hand tool, generally using a spring effect of a spring member 22 (spring washer, elastomer block, spring, etc.), enabling geometrical tolerances to be compensated and guaranteeing the required clamping.

If necessary, longitudinal loads are transferred to the track 10 by a shear member 24 on a lower face of the plunger 18 accommodated in the holes in the track 10.

Figure 3:
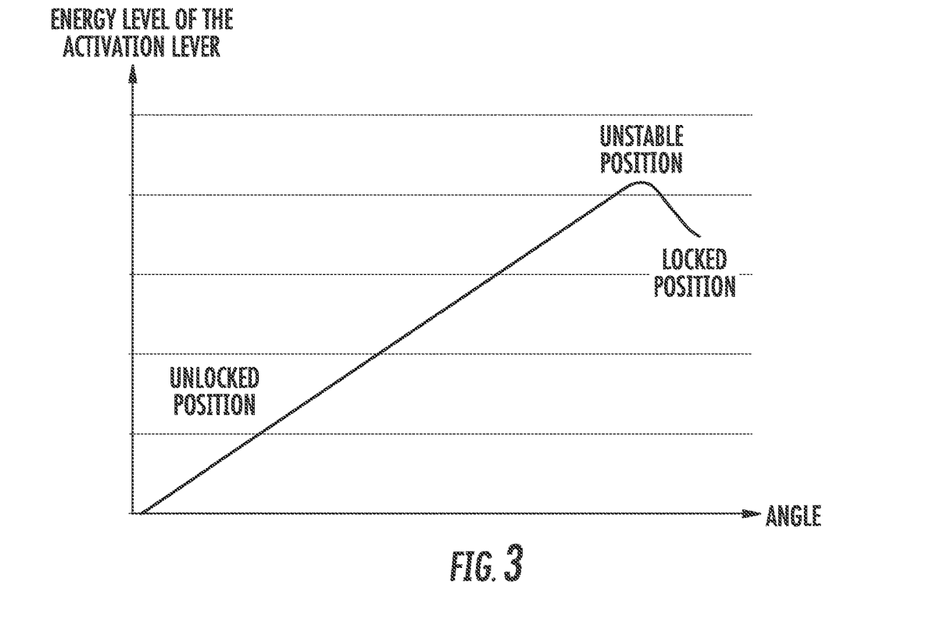
FIG. 3 is a graphical representation of the energy level on a lever for activating the attachment from FIG. 2 in an unlocked and locked state.
Figure 4:
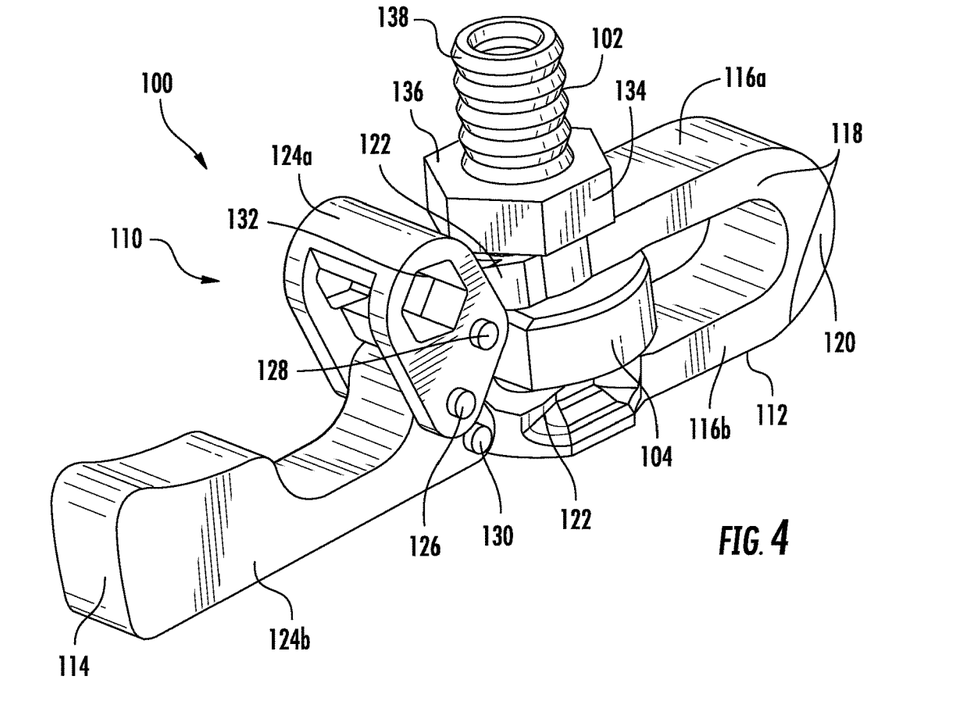
FIG. 4 is a perspective view of a seat track fitting, according to certain embodiments of the present invention.

Systems with no adjustment generally employ an activation lever 26. In most cases, the lever 26 generates the clamping effect and the line B1 of the clamping force passes through the lever 26, as can be seen in FIG. 2. A locking system 28 is used to hold the lever 26 in place, situated for example at one end of the lever 26. This system 28 is formed by a hook 30, for example, adapted to cooperate with a stud 32 that is part of the body 34 when the lever 26 is in the locked position. However, some of these locking systems 28 do not sufficiently secure the seat to the track 10. In fact, the lever 26 and/or the locking system 28 often remains in an unstable locking position (cf. FIG. 3), wherein the lever 26 and/or the locking system 28 does not enable the energy peak corresponding to the clamping effect to be maintained in the event of stresses exerted on the attachment, such as vibration. In other systems, this locking position is not clearly identifiable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seat track fitting comprises a stud comprises a spacer separated from a lower flange, and a locking mechanism comprising an elastic fitting comprising an upper arm and a lower arm connected by a resilient member, wherein an end of the upper arm and an end the lower arm are coupled to the stud, the end of the upper arm is positioned above the spacer (wherein the spacer may be part of the upper arm), and the end of the lower arm is positioned above the lower flange, and an activation mechanism comprising an upper leg pivotally coupled to a lower leg, wherein the upper leg is pivotally coupled to the end of the upper arm, and the lower leg is pivotally coupled to the end of the lower arm.

In certain embodiments, the elastic fitting has a U shape. The seat track fitting may further comprise a fixed interface coupled to the stud above the end of the upper arm. The lower flange may prevent an overload on the elastic fitting.

In some embodiments, the activation mechanism is configured to transition the seat track fitting to a locked position by pressing the lower leg down without the use of a tool. The activation mechanism may be configured to transition the seat track fitting to an unlocked position by inserting a tool into a receptacle and rotating the tool approximately one-quarter of a turn.

According to certain embodiments of the present invention, a seat track fitting comprises a stud comprising a lower flange, and a locking mechanism comprising an elastic fitting comprising an upper arm and a lower arm connected by a resilient member, wherein an end of the upper arm and an end of the lower arm are coupled to the stud, and the end of the lower arm is positioned above the lower flange, and an activation mechanism comprising an upper leg pivotally coupled to a lower leg via a central pivot, wherein the upper leg is pivotally coupled to the end of the upper arm via an upper pivot, and the lower leg is pivotally coupled to the end of the lower arm via a lower pivot, wherein the activation mechanism is configured to transition the seat track fitting between an unloaded position where the end of the lower arm is spaced apart from the lower flange, an unlocked position where the end of the lower arm is pressed against the lower flange, and a locked position where the end of the lower arm is positioned against a lip of a track.

In some embodiments, the stud further comprises a spacer separated from the lower flange, wherein the end of the upper arm is positioned above the spacer.

In certain embodiments, in the unloaded position, the upper pivot and the lower pivot are angularly separated by approximately 90 degrees. In the unlocked position, the upper pivot and the lower pivot may be angularly separated by approximately 175 degrees. The unlocked position may be a metastable position. In some embodiments, the activation mechanism transitions the seat track fitting to the unlocked position by causing the central pivot to pass through a plane formed by the upper pivot and the lower pivot.

In certain embodiments, the elastic fitting has a U shape. The seat track fitting may further comprise a fixed interface coupled to the stud above the end of the upper arm. The lower flange may prevent an overload on the elastic fitting.

According to certain embodiments of the present invention, a seat track fitting comprises a stud comprising a spacer separated from a lower flange, and a locking mechanism comprising an elastic fitting comprising an upper arm and a lower arm connected by a resilient member, wherein an end of the upper arm and an end the lower arm are coupled to the stud, the end of the upper arm is positioned above the spacer, and the end of the lower arm is positioned above the lower flange; and an activation mechanism comprising an upper leg pivotally coupled to a lower leg via a central pivot, wherein the upper leg is pivotally coupled to the end of the upper arm via an upper pivot, and the lower leg is pivotally coupled to the end of the lower arm via a lower pivot, wherein the activation mechanism is configured to transition the seat track fitting between an unloaded position where the end of the lower arm is pressed against the spacer, an unlocked position where the end of the lower arm is pressed against the lower flange, and a locked position where the end of the lower arm is positioned against a lip of a track.

In certain embodiments, in the unloaded position, the upper pivot and the lower pivot are angularly separated by approximately 90 degrees. In the unlocked position, the upper pivot and the lower pivot may be angularly separated by approximately 175 degrees. The unlocked position may be a metastable position. In some embodiments, the activation mechanism transitions the seat track fitting to the unlocked position by causing the central pivot to pass through a plane formed by the upper pivot and the lower pivot.

In certain embodiments, the elastic fitting has a U shape. The seat track fitting may further comprise a fixed interface coupled to the stud above the end of the upper arm. The lower flange may prevent an overload on the elastic fitting.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 4-9 illustrate embodiments of a seat track fitting 100 for coupling to a track 10. The seat track fitting 100 comprises a stud 102 having a lower flange 106. In certain embodiments, the stud 102 comprises a threaded shaft 138 with the lower flange 106 comprising a flared head of the threaded shaft 138. A spacer 104 may be positioned around the threaded shaft 138 and spaced apart from the lower flange 106 by a gap 108. In some embodiments, the lower flange 106 is sized to fit through a hole 20 in the track 10, while the spacer 104 may be sized larger than the hole 20 so that the spacer 104 is positioned proximate and above the lip 12. The gap 108 may be sized to be larger than the thickness of the lip 12 so that the stud 102 may be used with tracks 10 having a range of lip 12 thicknesses and track 10 depths.

The seat track fitting 100 further comprises a locking mechanism 110 to secure the stud 102 to the lip 12. The locking mechanism 110 comprises an elastic fitting 112 and an activation mechanism 114.

The elastic fitting 112 comprises an upper arm 116a and a lower arm 116b, in which a first end 118 of each arm 116a, 116b is connected by a resilient member 120. In certain embodiments, the elastic fitting 112 may have a "U shape,"

but any type of design that provides a resilient connection between the first ends 118 of the arms 116a, 116b may be used. The elastic fitting 112 may be formed of any suitable resilient material that can be shaped into a suitable resilient form, including but not limited to aluminum, stainless steel, aramid fibers, polycarbonate, polypropylene, other metallic materials, composite materials, or other similar materials.

In certain embodiments, a second end 122 of one of the upper arm 116a is connected to the stud 102 above the spacer 104, and a second end 122 of the lower arm 116b is connected to the stud 102 above the lower flange 106. In certain embodiments, the spacer 104 may be formed as a part of the second end 122 of the upper arm 116a. In these embodiments, the second end 122 of the lower arm 116b also has a flared shape that is shaped to contact the lip 12 in narrower sections between the holes 20 when the locking mechanism is the locked position (described in more detail below). The second ends 122 of the arms 116a, 116b are also pivotally connected to the activation mechanism 114.

The activation mechanism 114 comprises an upper leg 124a and a lower leg 124b. The upper leg 124a is pivotally coupled to the lower leg 124b via a central pivot 126. The upper leg 124a is also pivotally coupled to the upper arm 116a of the resilient member 120 via a upper pivot 128. Likewise, the lower leg 124b is pivotally coupled to the lower arm 116b of the resilient member 120 via a lower pivot 130.

Figure 5:
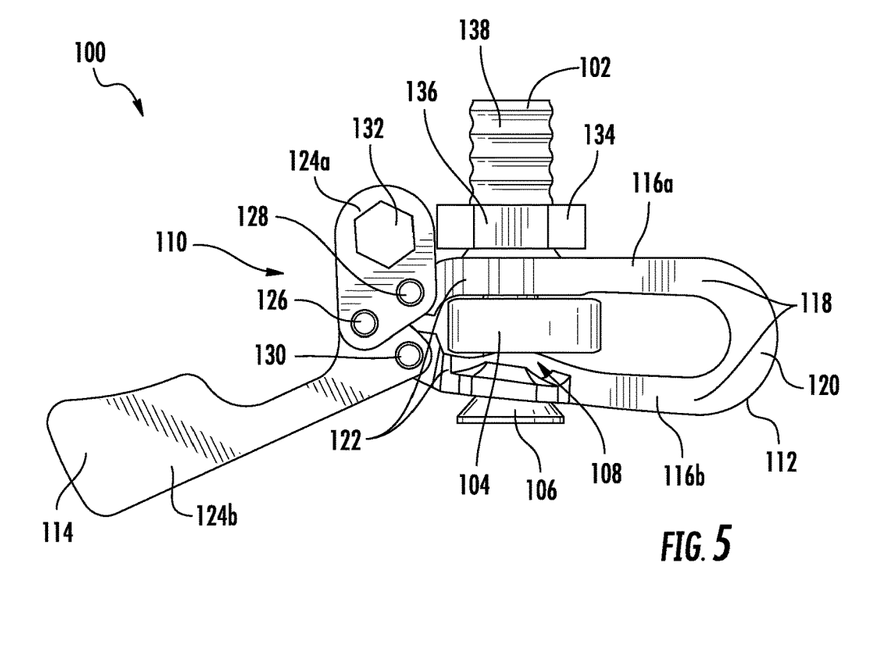
FIG. 5 is a side view of the seat track fitting of FIG. 4 in an unloaded position.
Figure 6A:
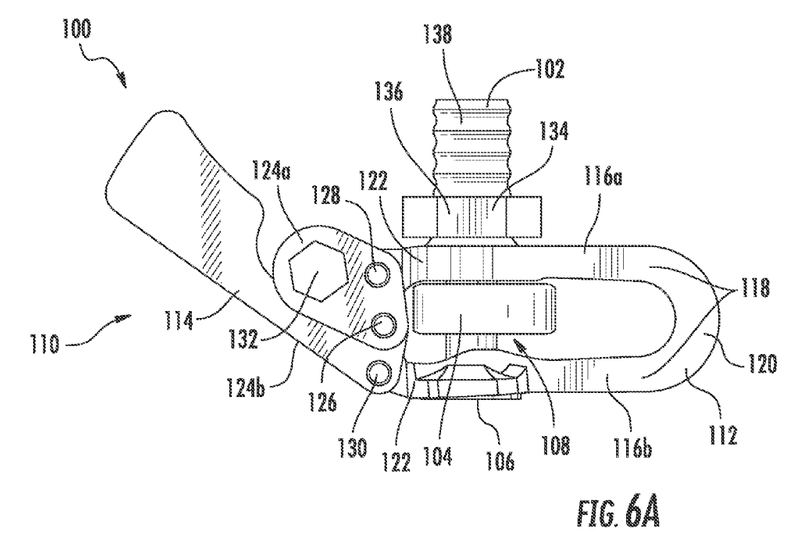
FIG. 6A is a side view of the seat track fitting of FIG. 4 in an unlocked position.
Figure 6B:
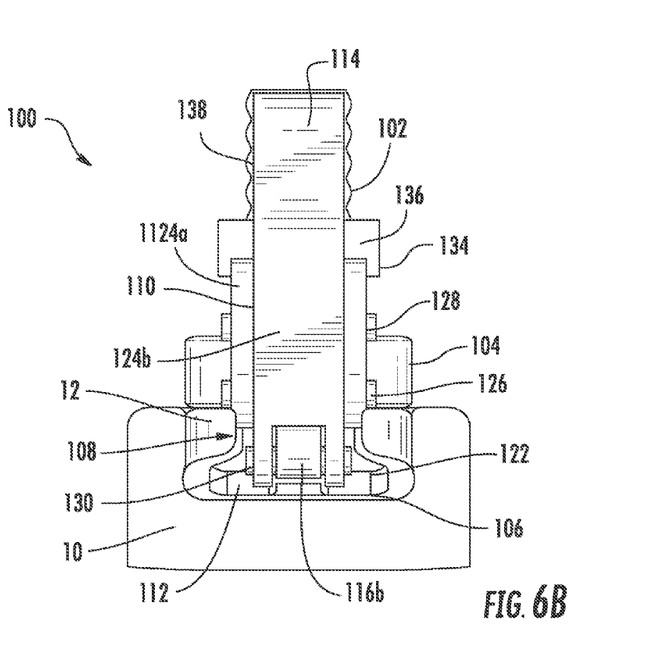
FIG. 6B is an end view of the seat track fitting of FIG. 4 in an unlocked position.
Figure 7A:
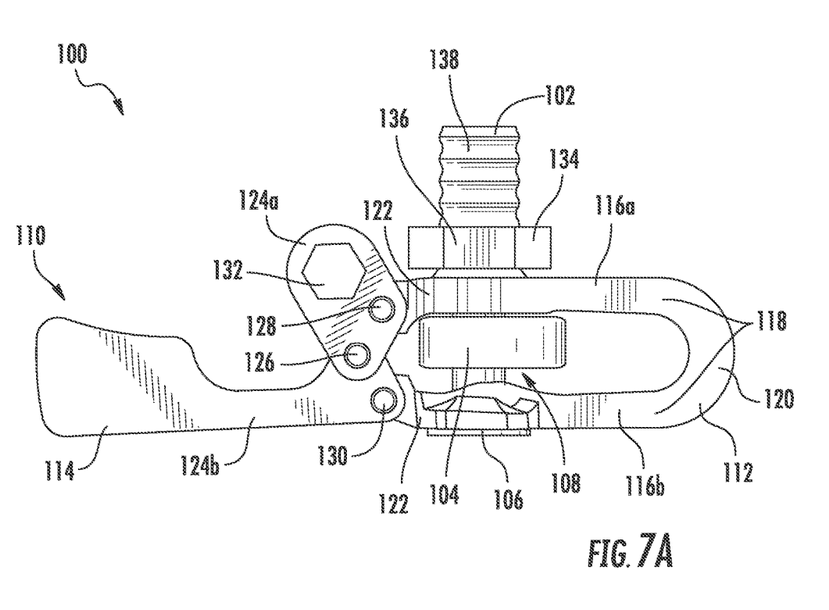
FIG. 7A is a side view of the seat track fitting of FIG. 4 in a locked position.
Figure 7B:
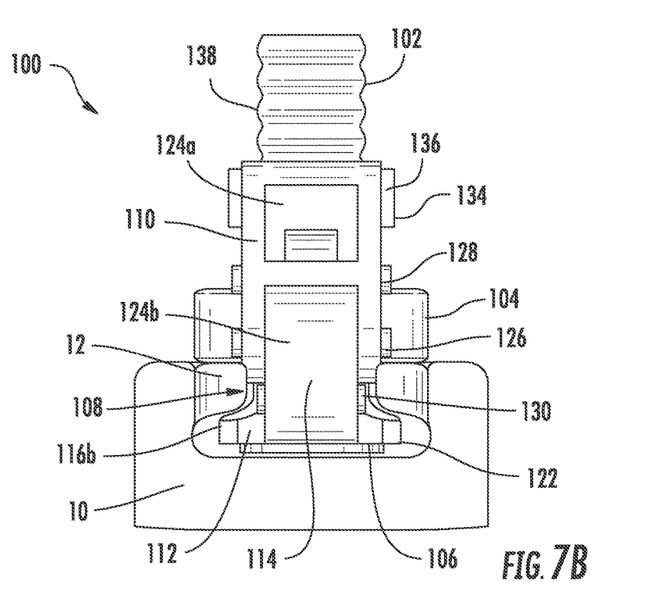
FIG. 7B is an end view of the seat track fitting of FIG. 4 in a locked position.

The activation mechanism 114 is configured to transition the seat track fitting 100 between an unloaded position (as shown in FIG. 5), an unlocked position (as shown in FIGS. 6A-6B), and a locked position (as shown in FIGS. 7A-7B).

In the unloaded position, the resilient member 120 is in a substantially relaxed state, where the second ends 122 of the arms 116a, 116b are positioned in close proximity to each other so that the second ends 122 are separated only by the thickness of the spacer 104. In this position, the lower leg 124b is rotated downward and the upper leg 124a is rotated upward so that the legs 124a, 124b are positioned away from each other as far as possible. As a result, the upper pivot 128 and the lower pivot 130 are positioned closely to one another and are aligned in a plane. The central pivot 126 is offset from the plane formed by upper pivot 128 and the lower pivot 130 in a direction opposite from the location of the elastic fitting 112. In this orientation, the upper pivot 128 and the lower pivot 130 are angularly separated by approximately 90 degrees.

In the unlocked position, the resilient member 120 is in a metastable position. In the metastable position, the central pivot 126 has crossed the plane formed by the upper pivot 128 and the lower pivot 130 so that the central pivot 126 is offset from the plane in the same direction as the elastic fitting 112. The position is considered "metastable" it has slightly lower strain on the resilient member 120 than the "unstable" position, in which the central pivot 126 is in perfect alignment with the plane formed by the upper pivot 128 and the lower pivot 130, and the second ends 122 of the arms 116a, 116b are spaced apart by the largest possible distance. In certain embodiments, the legs 124a, 124b may be designed in such a manner that the rotation is stopped when a lower rear face of upper leg 124a is in contact with an upper face of lower leg 124b.

In the unlocked position, the second end 122 of the upper arm 116a is biased against the spacer 104 and the second end 122 of the lower arm 116b is biased against the lower flange 106. In this orientation, the lower leg 124b is rotated upward and the upper leg 124a is rotated downward so that the legs 124a, 124b are positioned proximate one another. As a result, the upper pivot 128 and the lower pivot 130 are positioned away from one another and are separated by an angle that is a few degrees less than 180 degrees, such as approximately 170-175 degrees. By forcing the central pivot 126 to move past the "unstable" alignment position and shift to the other side of the plane formed by the upper pivot 126 and the lower pivot 128, the locking mechanism 110 achieves the "metastable" position because additional energy is required to push the central pivot back through the "unstable" alignment position in the plane formed by the upper pivot 128 and the lower pivot 130 to reach the unloaded and/or locked positions. The metastable position is designed to be close enough to the unstable position so that the activation lever 26 can be activated easily without any tool, and with a force of 50 N or less.

The unlocked position is configured to spread the arms 116a and 116b away from each other so that the stud 102 may be inserted into the track 10 until the lower flange 106 is below the lip 12 and moved longitudinally along the length of the track 10 until the stud 102 is in position under the lip 12 of the track 10 by a half-pitch of the hole 20.

In the locked position, the lower leg 124b is rotated down into the track 10 until it reaches a position that is approximately aligned with a lower surface of the track 10. The downward rotation of the lower leg 124b causes an upward rotation of the upper leg 124a, which causes the central pivot 126 to again cross the "unstable" alignment position in the plane formed by the upper pivot 128 and the lower pivot 130 so that the central pivot 126 is once again offset from the plane formed by the upper pivot 128 and the lower pivot 130 in in a direction opposite from the location of the elastic fitting 112. However, unlike the unloaded position, the lower leg 124b is not rotated the maximum distance away from the upper leg 124a because the rotation is halted by the position of the lower leg 124b against the track 10 lower surface and/or by the position of the second end 122 of the lower arm 116b against the lip 12 of the track 10. In other words, in the locked position, the resilient member 120 is still under some strain that causes the second end 122 of the upper arm 116a to apply a downward pressure on the spacer 104 and the second end 122 of the lower arm 116b to apply an upward pressure to the lip 12, which locks the seat track fitting 100 to the track 10.

Figure 8:
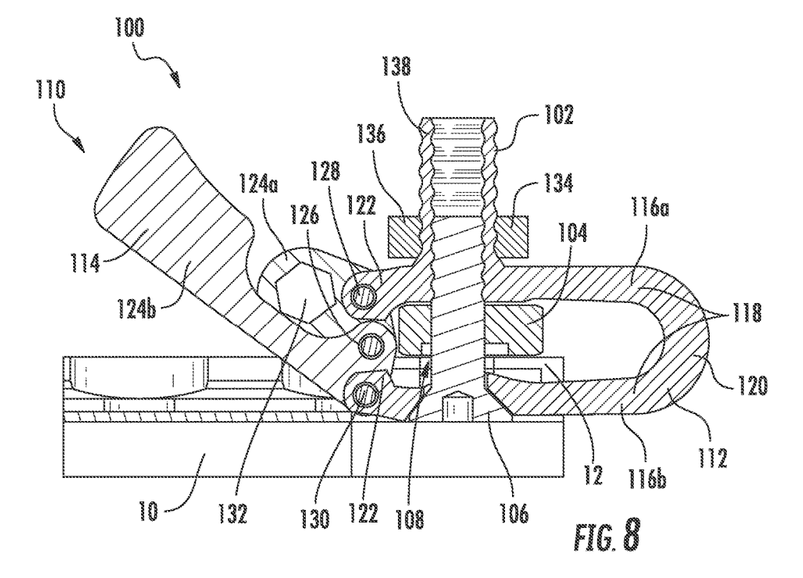
FIG. 8 is a side cross-sectional view of the seat track fitting of FIG. 4 in an unlocked position.

To unlock the seat track fitting 100, the upper leg 124a comprises a receptacle 132 that is shaped to allow insertion of a tool that is used to rotate the upper leg 124a downward approximately one-quarter of a turn, which also raises the lower leg 124b back into the unlocked position and releases the clamping force applied by the arms 116a, 116b to the lip 12 of the track 10.

In short, the seat track fitting 100 is configured so that no tool is needed to lock the seat track fitting 100 into place on the track 10, and the seat track fitting 100 may be unlocked from the track 10 by insertion of a tool and one-quarter turn of that tool.

The seat track fitting 100 further comprises a fixed interface 134 with the seat. For example, in certain embodiments, the fixed interface 134 comprises a double-nut 136 coupled to the threaded shaft 138.

Figure 9:
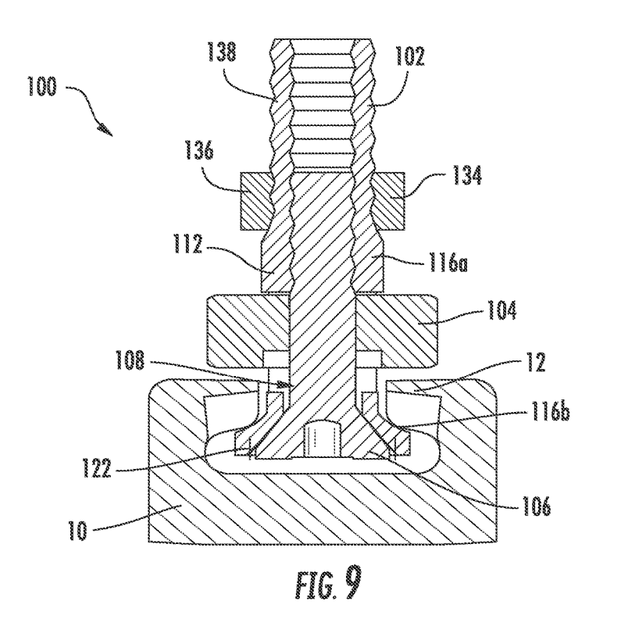
FIG. 9 is an end cross-section view of the seat track fitting of FIG. 4 showing the overload path system.

The seat track fitting 100 further comprises an overload path system to avoid overload in the resilient member 120 and in the locking mechanism 110. The overload path system is provided by having the maximum strain placed on the resilient member 120 controlled by the location of the lower flange 106 from the stud 102.

In certain embodiments, the elastic principle may be used on a rear track fitting 100.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seat track fitting comprising
a stud comprising a spacer separated from a lower flange; and
a locking mechanism comprising
an elastic fitting comprising an upper arm and a lower arm connected by a resilient member, wherein an end of the upper arm and an end the lower arm are coupled to the stud, the end of the upper arm is positioned above the spacer, and the end of the lower arm is positioned above the lower flange; and
an activation mechanism comprising an upper leg pivotally coupled to a lower leg, wherein the upper leg is pivotally coupled to the end of the upper arm, and the lower leg is pivotally coupled to the end of the lower arm.

2. The seat track fitting of claim 1, wherein the elastic fitting has a U shape.

3. The seat track fitting of claim 1, further comprising a fixed interface coupled to the stud above the end of the upper arm.

4. The seat track fitting of claim 1, wherein the lower flange prevents an overload on the elastic fitting.

5. The seat track fitting of claim 1, wherein the activation mechanism is configured to transition the seat track fitting to a locked position by pressing the lower leg down without the use of a tool.

6. The seat track fitting of claim 1, wherein the activation mechanism is configured to transition the seat track fitting to an unlocked position by inserting a tool into a receptacle and rotating the tool approximately one-quarter of a turn.

7. A seat track fitting comprising
a stud comprising a lower flange; and
a locking mechanism comprising
an elastic fitting comprising an upper arm and a lower arm connected by a resilient member, wherein an end of the upper arm and an end of the lower arm are coupled to the stud, and the end of the lower arm is positioned above the lower flange; and
an activation mechanism comprising an upper leg pivotally coupled to a lower leg via a central pivot, wherein the upper leg is pivotally coupled to the end of the upper arm via an upper pivot, and the lower leg is pivotally coupled to the end of the lower arm via a lower pivot;
wherein the activation mechanism is configured to transition the seat track fitting between an unloaded position where the end of the lower arm is spaced apart from the lower flange, an unlocked position where the end of the lower arm is pressed against the lower flange, and a locked position where the end of the lower arm is positioned against a lip of a track.

8. The seat track fitting of claim 7, wherein the stud further comprises a spacer separated from the lower flange, wherein the end of the upper arm is positioned above the spacer.

9. The seat track fitting of claim 7, wherein in the unloaded position, the upper pivot and the lower pivot are angularly separated by approximately 90 degrees.

10. The seat track fitting of claim 7, wherein in the unlocked position, the upper pivot and the lower pivot are angularly separated by approximately 175 degrees.

11. The seat track fitting of claim 7, wherein the unlocked position is a metastable position.

12. The seat track fitting of claim 7, wherein the activation mechanism transitions the seat track fitting to the unlocked position by causing the central pivot to pass through a plane formed by the upper pivot and the lower pivot.

13. The seat track fitting of claim 7, wherein the elastic fitting has a U shape.

14. The seat track fitting of claim 7, further comprising a fixed interface coupled to the stud above the end of the upper arm.

15. The seat track fitting of claim 7, wherein the lower flange prevents an overload on the elastic fitting.

16. A seat track fitting comprising
a stud comprising a spacer separated from a lower flange; and
a locking mechanism comprising
an elastic fitting comprising an upper arm and a lower arm connected by a resilient member, wherein an end of the upper arm and an end the lower arm are coupled to the stud, the end of the upper arm is positioned above the spacer, and the end of the lower arm is positioned above the lower flange; and
an activation mechanism comprising an upper leg pivotally coupled to a lower leg via a central pivot, wherein the upper leg is pivotally coupled to the end of the upper arm via an upper pivot, and the lower leg is pivotally coupled to the end of the lower arm via a lower pivot;
wherein the activation mechanism is configured to transition the seat track fitting between an unloaded position where the end of the lower arm is pressed against the spacer, an unlocked position where the end of the lower arm is pressed against the lower flange, and a locked position where the end of the lower arm is positioned against a lip of a track.

17. The seat track fitting of claim 16, wherein in the unloaded position, the upper pivot and the lower pivot are angularly separated by approximately 90 degrees.

18. The seat track fitting of claim 16, wherein in the unlocked position, the upper pivot and the lower pivot are angularly separated by approximately 175 degrees.

19. The seat track fitting of claim 16, wherein the unlocked position is a metastable position.

20. The seat track fitting of claim 16, wherein the activation mechanism transitions the seat track fitting to the unlocked position by causing the central pivot to pass through a plane formed by the upper pivot and the lower pivot.

21. The seat track fitting of claim 16, wherein the elastic fitting has a U shape.

22. The seat track fitting of claim 16, further comprising a fixed interface coupled to the stud above the end of the upper arm.

23. The seat track fitting of claim 16, wherein the lower flange prevents an overload on the elastic fitting.

* * * * *